US011392569B2

(12) United States Patent
Fu

(10) Patent No.: US 11,392,569 B2
(45) Date of Patent: Jul. 19, 2022

(54) TREE PARTITIONING OF THE SUCCINCT TRIE

(71) Applicant: ALIBABA GROUP HOLDING LIMITED, Grand Cayman (KY)

(72) Inventor: Chen Fu, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 85 days.

(21) Appl. No.: 16/824,599

(22) Filed: Mar. 19, 2020

(65) Prior Publication Data
US 2021/0294782 A1   Sep. 23, 2021

(51) Int. Cl.
   *G06F 16/22* (2019.01)
   *G06F 16/27* (2019.01)

(52) U.S. Cl.
   CPC ........ *G06F 16/2246* (2019.01); *G06F 16/278* (2019.01)

(58) Field of Classification Search
   CPC .... G06F 16/2246; G06F 16/23; G06F 16/278; H04L 45/48; H04L 45/54; H04L 45/745; H04L 45/7457; H04L 45/748
   See application file for complete search history.

(56) References Cited

U.S. PATENT DOCUMENTS

| | | | | |
|---|---|---|---|---|
| 2010/0034202 A1* | 2/2010 | Lu | ......................... | H04L 45/742 370/392 |
| 2010/0135305 A1* | 6/2010 | Lu | ......................... | H04L 45/54 370/395.31 |
| 2012/0257506 A1* | 10/2012 | Bazlamacci | ........ | H04L 45/7457 370/235 |
| 2017/0255670 A1* | 9/2017 | Lei | ...................... | H03M 7/3097 |
| 2019/0280976 A1* | 9/2019 | Wang | .................. | H04L 47/2483 |
| 2020/0004851 A1* | 1/2020 | Lambov | ............. | G06F 16/2246 |

OTHER PUBLICATIONS

Eatherton et al. "Tree bitmap: hardware/software IP lookups with incremental updates". Apr. 2004. SIGCOMM Comput. Commun. Rev. 34, 2 (Apr. 2004), 97-122. DOI:https://doi.org/10.1145/997150.997160. (Year: 2004).*

(Continued)

*Primary Examiner* — James E Richardson
(74) *Attorney, Agent, or Firm* — Finnegan, Henderson, Farabow, Garrett & Dunner, LLP

(57) ABSTRACT

The present disclosure provides a method comprising receiving an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence; separating a sub-trie from the trie by removing entries corresponding to the sub-trie from the first, the second, the third, and the fourth sequences; and updating an entry in the fourth sequence corresponding to a parent node of the sub-trie using a memory address of the sub-trie.

20 Claims, 18 Drawing Sheets

(56) References Cited

OTHER PUBLICATIONS

Timo Bingmann "STX B+ Tree C++ Template Classes," http://panthema.net/2007/stx-btree/, pp. 1-7 (2007).
Fay Chang et al. "Bigtable: A Distributed Storage System for Structured Data," 7th USENIX Symposium on Operating Systems Design and Implementation (OSDI 06), pp. 1-14 (2006).
Siying Dong "Plain Table—A New File Format," https://rocksdb.org/blog/2014/06/23/plaintable-a-new-file-format.html (2014).
Roberto Grossi "Fast Compressed Tries through Path Decompositions," Journal of Experimental Algorithmics (JEA), vol. 19, pp. 1-13 (2015).
Jen-Wei Hsieh et al. "Efficient Identification of Hot Data for Flash Memory Storage Systems," ACM Transactions on Storage, vol. 2, No. 1, pp. 22-40 (2006).
Justin J. Levandoski et al. "Identifying Hot and Cold Data in Main-Memory Databases," in Proceedings of the 2013 IEEE International Conference onData Engineering (ICDE 2013), pp. 1-12 (2013).
Patrick O'Neil et al. "The Log-Structured Merge-Tree," Acta Inf., vol. 33, No. 4, pp. 1-32 (1996).
Dongchul Park et al. "Hot Data Identification with Multiple Bloom Filters: Block-Level Decision vs I/O Request-Level Decision," Journal of Computer Science and Technology, 33(1): pp. 1-19 (2018).
Redis Labs "Basic Rate Limiting," https://redislabs.com/redis-best-practices/basic-rate-limiting/, pp. 1-3 (2020).
Huanchen Zhang et al. "SuRF: Practical Range Query Filtering with Fast Succinct Tries," in SIGMOD '18 Proceedings of the 2018 International Conference on Management of Data, Houston, TX, pp. 1-14 (2018).

\* cited by examiner

```
public static class LoudsIteration {
        boolean valid = false;
        int length = 0;
        int[] positions = new int[max_tre_height];
        boolean is_at_terminator = false;
}
```

FIG. 3

```
public LoudsIteration query (byte[] key) {
        LoudsIteration iter = new LoudsIteration ();

int nodePosition = 0;

int level;
        for (level = 0; level < key.length; level++) {
                int labelPosition = Search (nodePosition, key[level]);
                if (labelPosition is invalid) {
                        //no match, return an invalid iterator with a partial path/prefix
                        return iter;
                } iter.positions[iter.len] = labelPosition;
                iter.length++;
                if (!hasChild[labelPosition]) {
                        //trie branch terminates, so we found a prefix of the search key
                        iter.is_at_terminator = false;
                        iter.valid = true;
                        return iter;
                }

//move to child
                nodePosition = ChildPos (labelPosition);
        } if ((labels[nodePosition] == 0xFF) && NodeSize(nodePosition) > 1) {
                //perfect match!
                iter.positions[iter_len] = nodePosition;
                iter.length++;
                iter_is_at_terminator = true;
                iter_is_valid = true;
        }

// when no match, iter points to an internal node
        return iter;
}
```

FIG. 4

```
Class Sequences {
        labels; // the "labels" sequence of a certain tree level
        hasChild; // the "hasChild" sequence of the same level
        louds; // the "LOUDS" sequence of the same level
        values; // the "Values" sequence of the same level
}

Input:
        k; // number of nodes to remove
        input_sequences; //sequences from a given level Output:
        output_sequences; //sequences containing the removed k nodes Process:
        int n = select (input_sequences.louds, k + 1);
        output_sequences.labels = remove first n elements from input_sequences.labels
        output_sequences.hasChild = remove first n elements from input_sequences.hasChild
        output_sequences.louds = remove first n elements from input_sequences.louds
```

FIG. 13

```
Input:
    List <Value> subTreeAddr;
    List <Value> newValues;

// Scanning "hasChild" sequence at the bottom level
for (bit b : hasChild[bottomLevel]) {
    if (b == 0) {
        newValues.add (values[bottomLevel].removeFirst());
    }
    else {
        flip this bit in hasChild[bottomLevel];
        newValues.add(subTreeAddr.removeFirst());
    }
}
```

FIG. 17

TREE PARTITIONING OF THE SUCCINCT TRIE

BACKGROUND

In data storage systems, a succinct trie data structure can be used as filters and indexes to help databases to speed up query executions. Usually, a data run can be organized as a tree to facilitate efficient data query, at a cost of extra storage for storing indexes. Since filters and indexes are more likely to be kept in high cost storage media, there is a strong incentive to use partitioning to drive down the size of index data structures for faster querying. Moreover, conventional systems do not partition a succinct trie directly and efficiently.

SUMMARY

Embodiments of the present disclosure provide a method comprising receiving an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence; separating a sub-trie from the trie by removing entries corresponding to the sub-trie from the first, the second, the third, and the fourth sequences; and updating an entry in the fourth sequence corresponding to a parent node of the sub-trie using a memory address of the sub-trie.

Embodiments of the present disclosure provides a data storage system comprising a memory storing a set of instructions; and a processor configured to execute the set of instructions to cause the data storage system to receive an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence, separate a sub-trie from the trie by removing entries corresponding to the sub-trie from the first, the second, the third, and the fourth sequences, and update an entry in the fourth sequence corresponding to a parent node of the sub-trie using a memory address of the sub-trie.

Embodiments of the present disclosure also provide a non-transitory computer readable medium that stores a set of instructions that are executable by one or more processors of an apparatus to perform a method comprising receiving an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence; separating a sub-trie from the trie by removing entries corresponding to the sub-trie from the first, the second, the third, and the fourth sequences; and updating an entry in the fourth sequence corresponding to a parent node of the sub-trie using a memory address of the sub-trie.

BRIEF DESCRIPTION OF THE DRAWINGS

Embodiments and various aspects of the present disclosure are illustrated in the following detailed description and the accompanying figures. Various features shown in the figures are not drawn to scale.

FIG. 3 illustrates an example pseudocode defining a data structure "LoudsIteration."

FIG. 4 illustrates an example pseudocode for querying a key in a trie using a data structure "LoudsIteration."

FIG. 13 illustrates an example pseudocode for separating a number of nodes from a set of sequences in a succinct trie, according to some embodiments of the present disclosure.

FIG. 17 illustrates an example pseudocode for reaching sub-tries from a main succinct trie, according to some embodiments of the present disclosure.

DETAILED DESCRIPTION

The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

In data storage systems, log structured merge trees structure ("LSM Tree Structure") is one of the de facto standards for data storage. In an LSM Tree Structure, data can be organized into multiple sorted runs. New updates on the data can be sorted as they enter an in-memory write buffer. Content in the buffer can be written to storage disks when the buffer becomes full, forming a new sorted run. Multiple new sorted runs can be merged periodically in order to keep the number of sorted runs under control.

A system that incorporates the LSM Tree Structure usually support three operations: put, get, and scan. The put operation can take as input a key and a value, and update data record associated with the given key using the value. The get operation can take as input a key and read a data record associated with the given key. The scan operation can take as input a start value and an end value and read all records that have keys in the range between the start value and the end value.

An index can be a data structure that can improve the speed of data retrieval operations (e.g., get operation or scan operation) at a cost of additional writes and storage space to maintain an index data structure. Indexes can be used to quickly locate data without having to search every row in a data collection each time the data collection is accessed.

A trie can be a prefix search tree. In a trie, keys are usually strings of bytes. All descendants of a node can have a common prefix of a string that is associated with that node. A root can be associated with an empty string.

Figure 1:
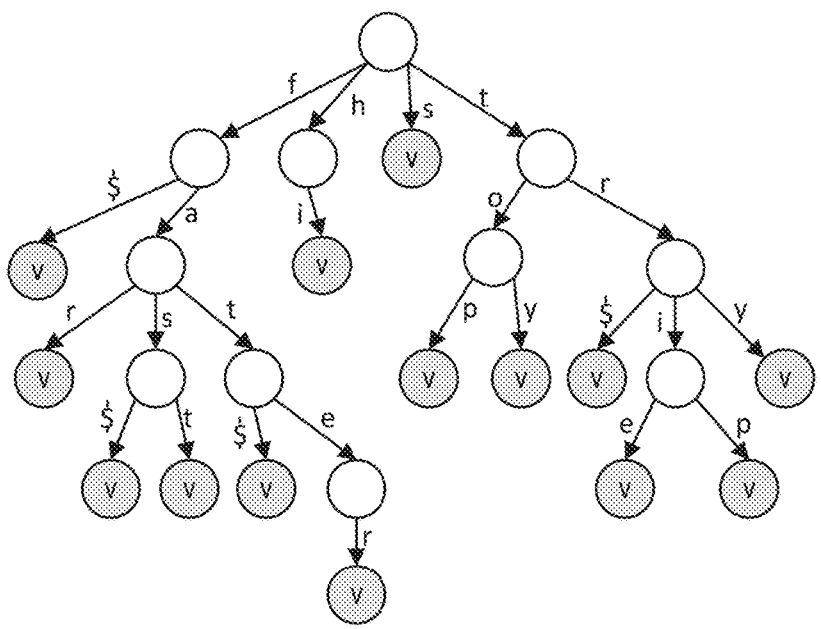
FIG. 1 illustrates a schematic diagram of an example succinct trie data structure.

Some of the systems incorporating the LSM Tree Structure use a succinct trie data structure to improve memory efficiency. FIG. 1 illustrates a schematic diagram of an example succinct trie data structure. As shown in FIG. 1, the succinct trie data structure comprises trie, which is an ordered tree data structure where keys can be strings. The table of FIG. 1 shows contents of a sorted map, and the right-hand side of FIG. 1 shows how the contents are stored in a trie map.

All descendants of a node have a common prefix of the string, which is represented by the path from the root to that node. For example, as shown in FIG. 1, key "far" and "fas" are descendants of a node whose path from the top reads keys "f" and "a" in order. All labels are shown as letters for illustration purposes only. It is appreciated that the labels can be any byte values. It is appreciated that a prefix of a string can also be the whole string itself. For example, a prefix for key "far" can also be "far."

To retrieve a value associated with a specific string key, a get operation can be performed starting from the root node, and following a pointer labeled by each element of the string key. For example, to retrieve a value associated with a string key "fast," the get operation can start from the root node and follow the label "f" to reach the left most node on the second level of the tree. Then, the get operation can follow the next label "a" to reach the left most node on the third level. The get operation continues to follow two more labels "s" and "t" to reach the node that represents the value associated with the key "fast."

As shown in the example above, the path from the root node to the node that represents the value comprises a common prefix shared by all descendants. In some cases, a key's prefix can also be a key itself. For example, as shown in FIG. 1, prefix "fas" can also be a key. As a result, a special label (e.g., "$") can be used to show that a prefix can also be a valid key, and the pointer labeled by the special label points to a value that is associated with the prefix.

Traditional node-and-pointer implementation of the trie data structure is still not memory efficient, since the pointers can take up a lot of space in memory. A form of succinct trie can reduce memory footprint by avoiding using pointers. The succinct trie can use a Level-Ordered Unary Degree Sequence ("LOUDS") to encode the tree. In a LOUDS structure, nodes can be laid out in a breadth-first order, and each node's degree is encoded using the unary code.

Figure 2:
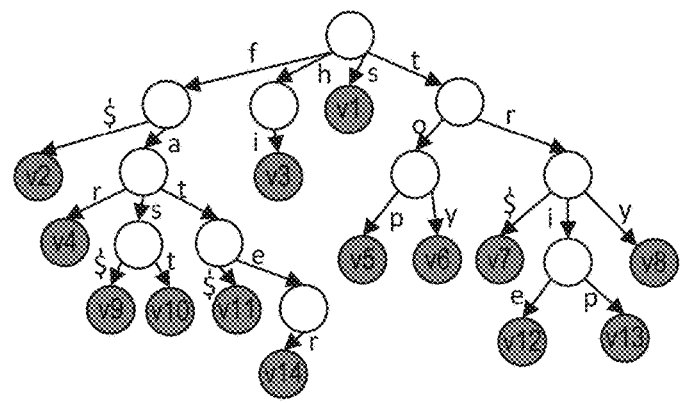
FIG. 2 illustrates a schematic diagram of an example succinct trie data structure using LOUDS structure.

FIG. 2 illustrates a schematic diagram of an example succinct trie data structure using LOUDS structure. The top portion of the succinct trie data structure in FIG. 2 shows a traditional trie map, and the bottom portion of FIG. 2 shows the LOUDS encoding of the trie map. As shown in FIG. 2, the LOUDS encoding comprises four sequences, namely "labels," "hasChild," "louds," and "values."

The "labels" sequence is a byte sequence that records all the branching labels. For example, as shown in FIG. 2, the root node has 4 labels "f," "h," "s," and "t." The next nodes based on the breadth-first search sequence has two labels— "$" and "a." In some implementations, label "$" can be a byte value 0xFF, and label "$" can always be located at the beginning of each node. As the labels in a node are sorted in ascending order, the beginning of each node can be distinguished by locating each label "$." It is appreciated that label "$" may not appear in a single label node.

The "hasChild" sequence is a bit sequence that includes one bit for each byte in the "labels" sequence. Each entry in the "hasChild" sequence indicates whether the corresponding label has a child branch. For example, as shown in FIG. 2, label "s" under the root node has no further branches. As a result, the corresponding entry in the sequence "hasChild" comprises a value "0."

The "louds" sequence is a bit sequence that includes one bit for each byte in the "labels" sequence. The "louds" sequence indicates boundaries of each node. If a label is the first in a node, its "louds" bit is set to 1. For example, as shown in FIG. 2, the root node has 4 labels, indicated by the first "1000" in the "louds" sequence. The first label under the root node is "f," which has a "louds" value of 1. The rest of the labels under the root node are "h," "s," and "t," and these labels each have a "louds" value of 0. The second node is the one pointed by the label "f" in the root node, which has two labels "$" and "a." As a result, the "louds" sequence right after the root node reads "10." The third node is the one pointed by the label "h" in the root node, which has only one label "i." As a result, the "louds" value for label "i" is 1.

The "values" sequence can store values that correspond to each byte in the "labels" sequence. In some implementations, each entry in the "values" sequence is a fixed-length pointer to a file block (on a secondary storage media) containing a set of data records having keys fall between the keys in the trie. For example, the value associated with label "s" may point to the data block containing records with keys such as "s", "sara", "sophia" (any keys that should be sorted after "s" and before "top").

To query the trie, the "louds" sequence is scanned from the beginning. First, a search operation Search (pos, b) can be used. The search operation takes as input a starting position pos of a node. Since pos position represents a starting position of a node, the value of the "louds" sequence at the pos position, which can be represented as louds[pos], is always 1. The "louds" sequence can then be scanned until a location right before the next value of 1 is reached to obtain all labels in this node. For example, when "pos" is equal to 0, the starting position is the root node. By scanning the "louds" sequence to the next value of 1, 4 labels "f," "h," "s," and "t" can be obtained. Given a label b, the search operation Search (pos, b) can return the position of label "b" in the current node:

Search(pos,b): return the position of label b in starting from pos. (1)

Next, two more operations can be established to help with the query operation. A rank operation $rank_1$ (bitVector, i) can count the number of value "1" up to position i in a given bit vector bitVector. A select operation $select_1$ (bitVector, i) can return the position of the i-th value "1" in a given bit vector bitVector:

$rank_1$(bitVector,i): scan bitVector to return number of is up to position i; (2)

$select_1$(bitVector,i): scan bitVector to return position of the i-th 1. (3)

Based on these operations, a position of a child label can be determined using a ChildPos (pos) operation. The ChildPos (pos) operation can be represented as:

ChildPos(pos)=$select_1$(louds,$rank_1$(hasChild,pos)+1). (4)

For example, to query a key "fast," the query operation starts at the root node where pos=0. Here, the first label to be searched is "f." Using operation Search (0, "f"), it can be determined that the position of the first label "f" is at 1. Then, operation $rank_1$ (hasChild, 1) is executed to determine if the label "f" has any child labels. In this case, operation $rank_1$ (hasChild, 1) evaluates to 1, and $select_1$ (louds,1+1) evaluates to 4. As a result, the position of the child node represented by label "f" is 4. The next label is "a," and operation ChildPos (Search (4, "a")) can find the position of the child node represented by label "a." Here, the variable pos is updated to "5." This process can repeated until a position is reached where hasChild [pos]=0, indicating that the end of a valid key has been reached.

Once a valid key in the trie has been reached, an operation ValuePos (pos) can be used locate the position of the valid key's associated value in the "values" sequence:

ValuePos(pos)=pos−$rank_1$(hasChild,pos)−1. (5)

For example, as shown in FIG. 2, the position for the key "fast" is at 19. As a result, operation $rank_1$ (hasChild, 19) is executed to return a result 9, since the number of is up to position 19 in sequence "hasChild" is 9. Operation ValuePos (19)=19−9 can then be executed to return a result 10. Therefore, the 10-th value in the "values" sequence is the value the corresponds to the key "fast." As shown in FIG. 2, the 10-th value in the "values sequence is "V10."

To facilitate the traversing of a trie, a data structure "LoudsIteration" can be defined. A "LoudsIteration" data structure can represent a path in the trie, from the root to the current node, with each element of the positions array representing the position of the label. FIG. 3 illustrates an example pseudocode defining a data structure "LoudsIteration." As shown in FIG. 3, the data structure "LoudsIteration" comprises four variables, namely "valid," "length," "positions," and "is_at_terminator." The "valid" variable shows whether the path defined in the data structure "LoudsIteration" is valid. The "length" variable shows the length of the path defined in the data structure "LoudsIteration." The "positions" variable shows the locations of labels along the path defined in the data structure "LoudsIteration." The "is_at_terminator" variable shows whether the path defined in the data structure "LoudsIteration" is a perfect match for the labels.

For example, as shown in FIG. 2, when the query key is "fast," the "LoudsIteration" object should be a valid one (e.g., "valid" variable is equal to "true"). There are four positions: 0, 5, 10, and 18. In the "Labels" sequence shown in FIG. 2, "Labels[0]" is equal to "f," "Labels[5]" is equal to "a," "Labels[10]" is equal to "s," and "Labels[18]" is equal to "f." As a result, the "positions" variable should read as (0, 5, 10, 18).

FIG. 4 illustrates an example pseudocode for querying a key in a trie using a data structure "LoudsIteration." As shown in FIG. 4, function "query" takes as input a key, and outputs a "LoudsIteration" data structure that comprises a path of locations for the key. The function "query" shown in FIG. 4 can update the variables "valid," "length," "positions[ ]," and "is_at_terminator" of a "LoudsIteration" object "iter." The "valid" variable of object "iter" can provide information on whether there is a match. If there is a match, ValuePos (iter.positions [iter.len−1]) can be used to retrieve the value associated with the key from the "values" sequence.

Filters and indexes are critical for read performance in LSM Tree Structures. Filters and indexes can provide an initial assessment of whether a key may exist in a sorted run. For example, in LSM Tree Structures, each sorted run can be equipped with a bloom filter that is used to speed up the get operation. The bloom filter can facilitate the get operation by quickly pointing out whether the given key can be found in the sorted run with a relatively high accuracy. As a result, the system can quickly determine whether a sorted run contains the given key and skip most of the sorted runs that are determined to not contain the given key. Unfortunately, bloom filters do not help with scan operations, and every single sorted run must be queried to serve a scan operation.

Figure 5:
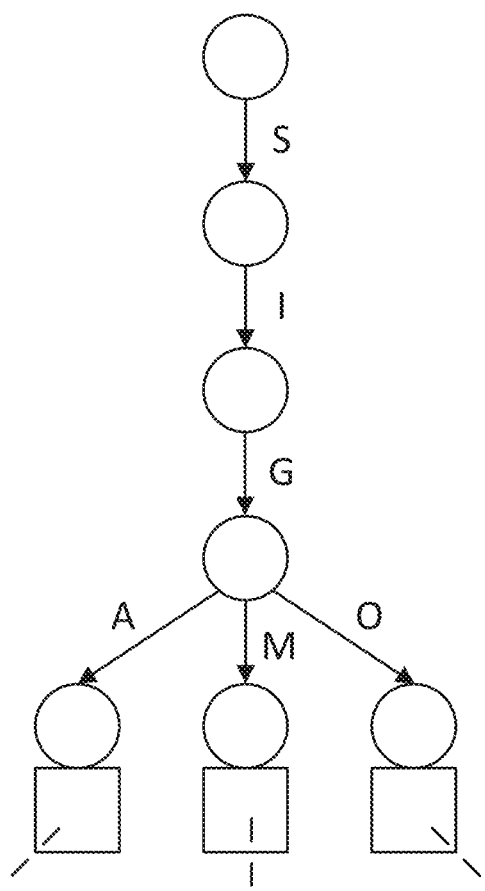
FIG. 5 illustrates an example truncated trie using Succinct Range Filters.

Some of the systems incorporating the LSM Tree Structure use a new filter—Succinct Range Filter ("SuRF"). The SuRF is based on succinct trie data structures (e.g., succinct trie shown in FIG. 2). The SuRF is a compact data structure that inserts keys in a truncated trie. FIG. 5 illustrates an example truncated trie using Succinct Range Filters. As shown in FIG. 5, the truncated trie contains a set of data records that comprises keys "SIGAI," "SIGMOD," and "SIGOPS." The data records share a common prefix "SIG," which can be saved and represented only once in the truncated trie. In addition, the truncated trie may contain a unit memory (e.g., one byte) for each of the next keys "A," "M," and "0," hence truncating the keys beyond the "SIGA," "SIGM," and "SIGO" prefixes. In some embodiments, FIG. 5's truncated trie can be implemented using succinct data structure shown in FIG. 2.

Although the truncated tree is more memory efficient, it can lead to false positives. For example, when a query searches for a key "SIGMETRICS," the truncated tree in the SuRF may still return a positive result, since the prefix "SIGM" exists in the truncated trie. One way to mitigate the false positive issue is to add a hash value of a fixed length (e.g. 8 bits) as the key's associated value in the trie map, As shown in FIG. 5, the hash values for each prefixes "SIGA," "SIGM," and "SIGO" are denoted as squares. In some embodiments, the hash value can be the value in the succinct trie data structure shown in FIG. 2.

The SuRF supports range queries. As a result, SuRF can speed up both get operations and scan operations. This is a step forward over the bloom filters. Unfortunately, both filters and indices cost extra memory for higher query performance. In addition, a sorted run is usually organized as a read only B+ tree to facilitate efficient data query, at a cost of extra storage for storing the indexes. Since indexes are more likely to be kept in high cost memory media such as a dynamic random-access memory ("DRAM"), there exists a strong incentive to drive down the size of the index data structure to drive down memory cost. It is highly desirable to continue improve the memory efficiency of the data structure for cost saving purposes.

Figure 6:
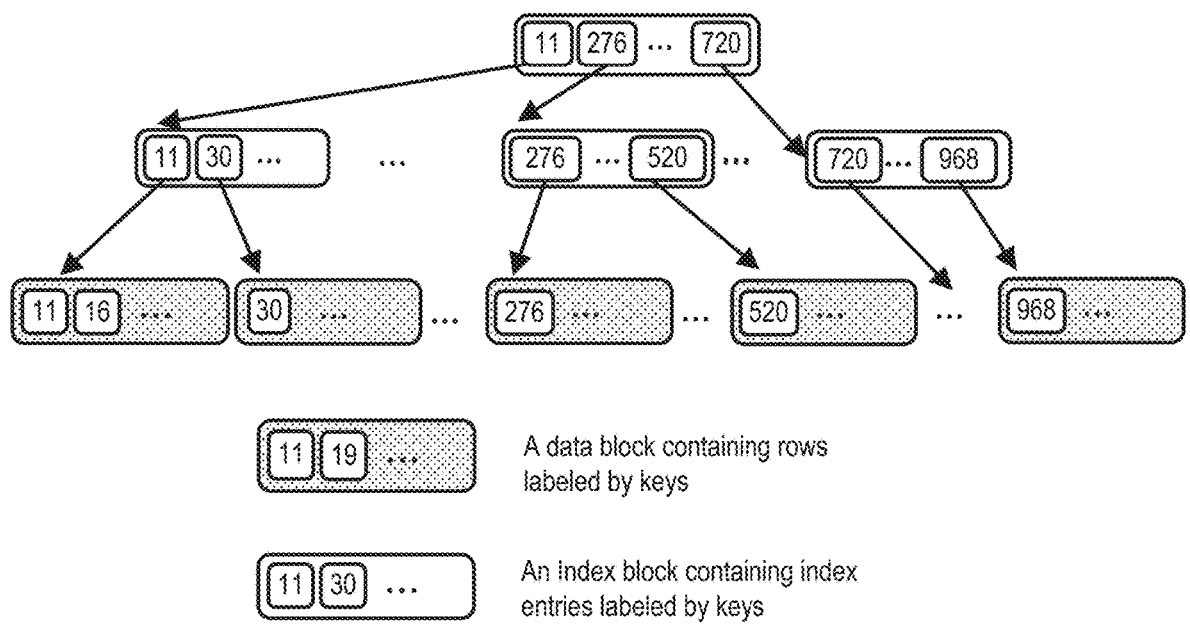
FIG. 6 illustrates an example structure of a B+ tree, according to some embodiments of the present disclosure.

To further improve over the SuRF, indexes can be used to speed up query of a single sorted data run. As mentioned above, a sorted data run is usually organized as a read only B+ tree. FIG. 6 illustrates an example structure of a B+ tree, according to some embodiments of the present disclosure. As shown in FIG. 6, at the bottom of the B+ tree, each data block can contain records sorted by keys. Above the data blocks are one or more levels of index blocks. Each index block has multiple index entries. An index entry can contain a key and a pointer to another block in a lower level, where the key corresponds to the first key in the pointed block. For example, the index block at the top comprises three keys "11," "276," and "720." The key "276" contains a pointer that points to another index block in the second level, and the first key in the index block that key "276" points to is also "276."

Figure 7:
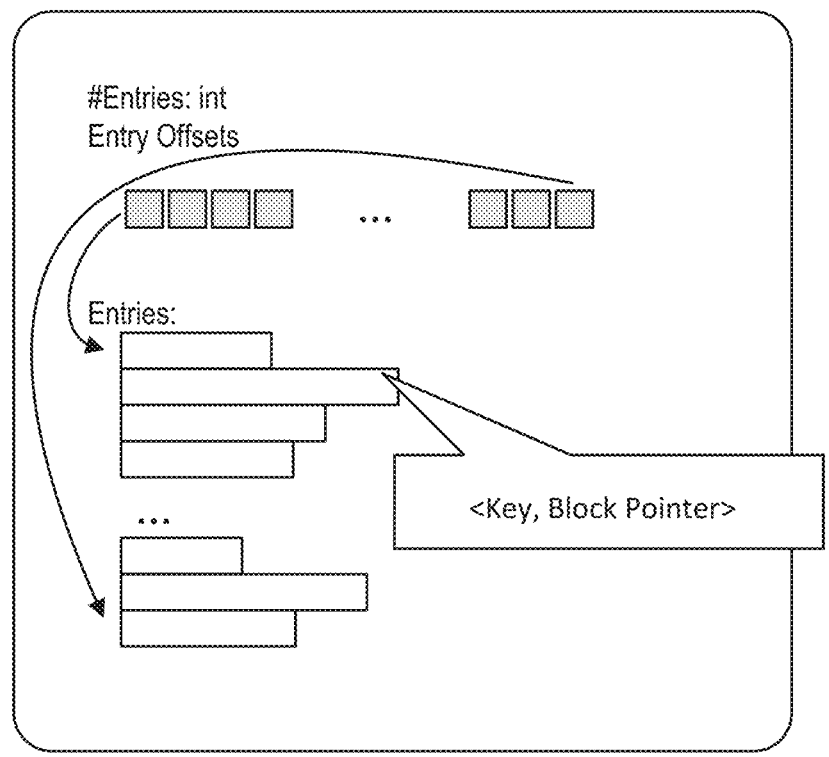
FIG. 7 illustrates an example data structure of an index block in a B+ tree, according to some embodiments of the present disclosure.

FIG. 7 illustrates an example data structure of an index block in a B+ tree, according to some embodiments of the present disclosure. As shown in FIG. 7, the first field can indicate a total number of entries in the block, followed by a list of pointers pointing to the start of each index entry in the block. The pointers in the list can have fixed sizes. As a result, the list of pointers can be used for binary search, since the list of pointers can help the system to quickly locate any entry without sequentially scanning from the very beginning. Following the list of points are index entries, each of which comprises a key and a block pointer.

As shown in FIG. 6 and FIG. 7, keys can be sorted in the B+ tree. As a result, adjacent keys may share a common prefix. In many existing B+ tree implementations, keys are stored in their entirety in the index, leading to redundancy. A trie (e.g., succinct trie of FIG. 1) can be used to remove this redundancy. Traditional trie data structure is not used for reducing the index size, since the pointers in the data structure take up too much memory space, negating all space savings. In addition, it is not clear how a succinct trie structure can be partitioned into blocks.

Figure 8:
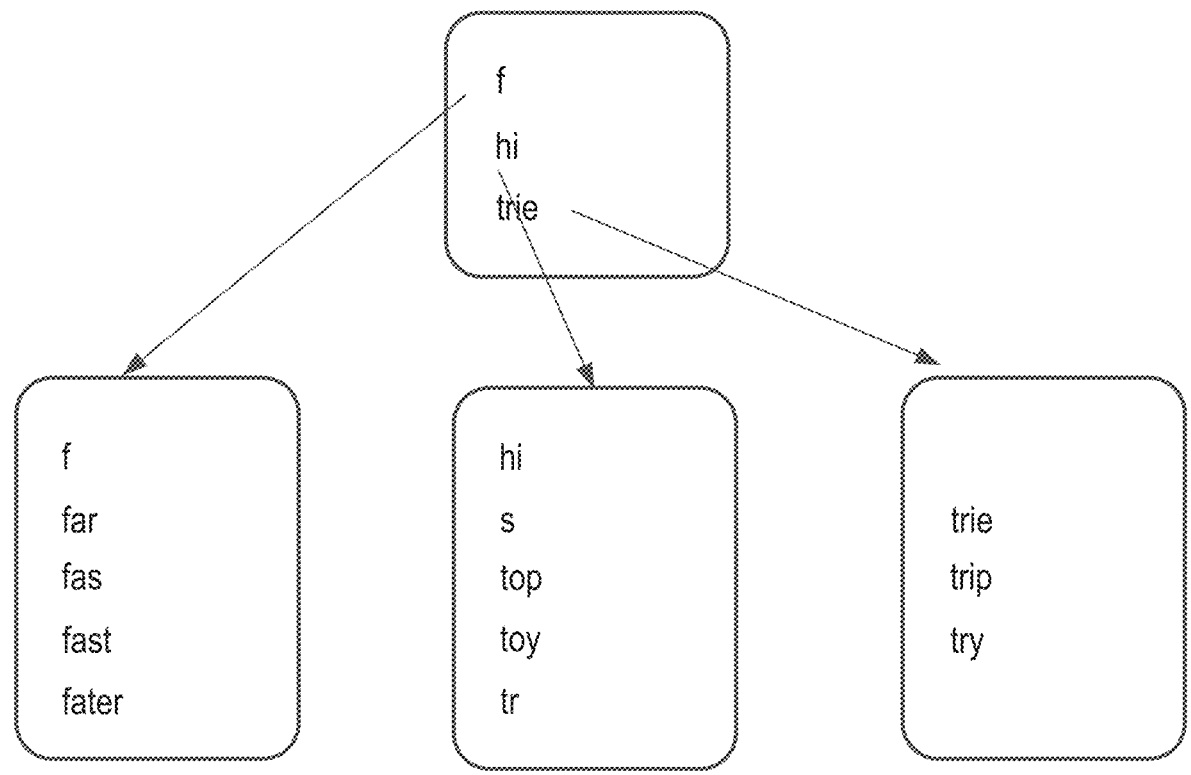
FIG. 8 illustrates an example method to split an index block.

One way of splitting a big index block into smaller ones is shown in FIG. 8. FIG. 8 illustrates an example method to split an index block. As shown in FIG. 8, the trie index shown on the left side of FIG. 7 can be split into a tree structure. The entries in a subblock can act as an index, and the entries can point to another subblock that stores more entries. For example, entry "f" can point to another subblock that stores entries "f," "far," "fas," "fast," and "fater." It is appreciated that each block can form a stand-alone succinct trie.

One issue with the approach shown in FIG. 8 is that each trie has approximately the same depth as an average key length. Performance wise, time spent on querying a trie is proportional to the depth of the trie. Since the trie itself is already a tree structure, if the trie can be partitioned directly, we can significantly lower the trie depth in each of the resulting subblocks to achieve better performance.

Figure 9:
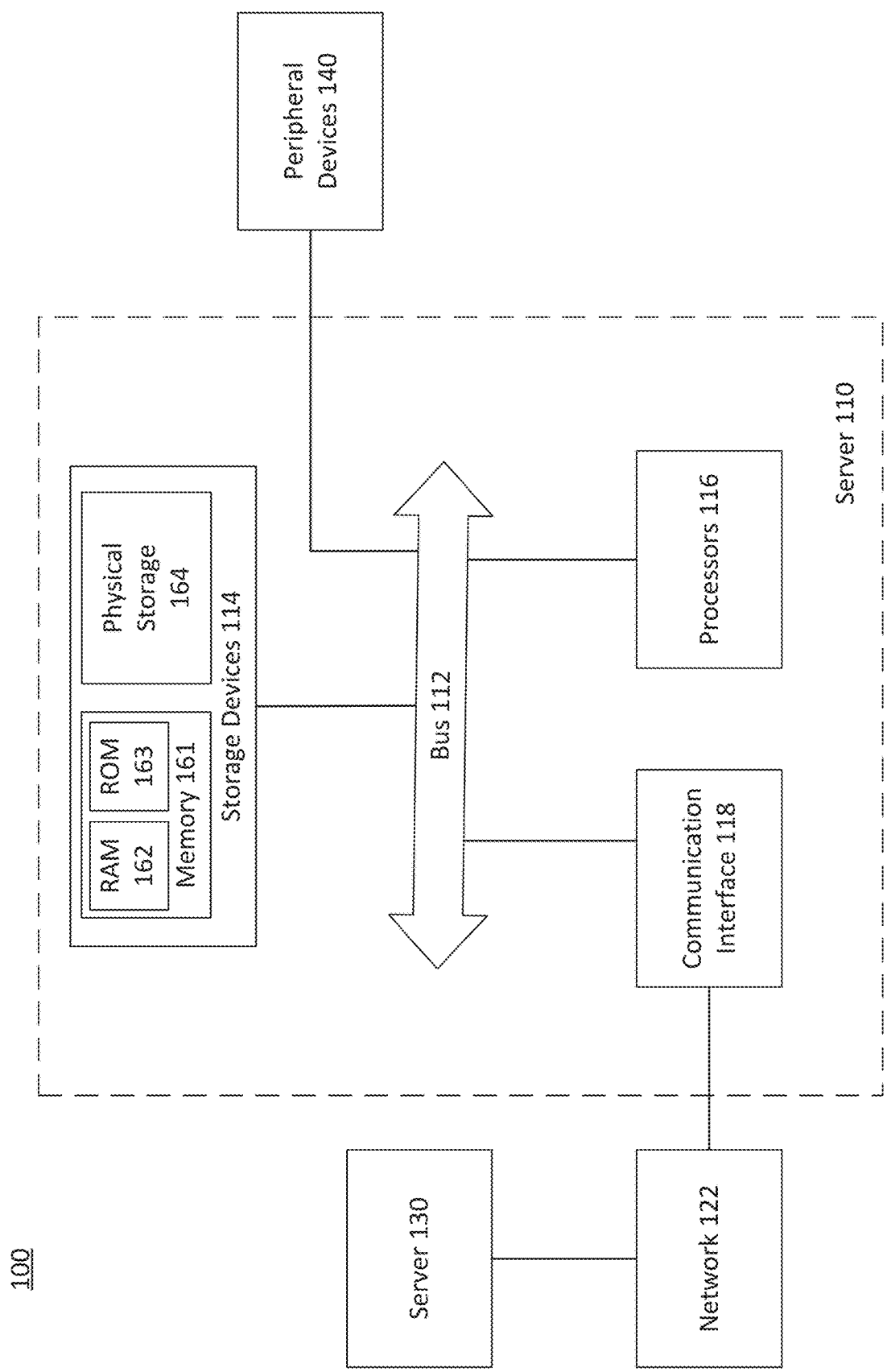
FIG. 9 is a schematic diagram illustrating an example server of a data storage system, according to some embodiments of the present disclosure.

The present disclosure provides new algorithms for trie partition to improve query performance. FIG. 9 is a schematic diagram illustrating an example server of a data storage system, according to some embodiments of the present disclosure. According to FIG. 9, server 110 comprises a bus 112 or other communication mechanism for communicating information, and one or more processors 116 communicatively coupled with bus 112 for processing information. Processors 116 can be, for example, one or more microprocessors.

Server 110 can transmit data to or communicate with another server 130 through a network 122. Network 122 can be a local network, an internet service provider, internet, or any combination thereof. Communication interface 118 of server 110 is connected to network 122. In addition, server 110 can be coupled via bus 112 to peripheral devices 140, which comprises displays (e.g., cathode ray tube (CRT), liquid crystal display (LCD), touch screen, etc.) and input devices (e.g., keyboard, mouse, soft keypad, etc.).

Server 110 can be implemented using customized hard-wired logic, one or more ASICs or FPGAs, firmware, or program logic that in combination with the server causes server 110 to be a special-purpose machine.

Server 110 further comprises storage devices 114, which may include memory 161 and physical storage 164 (e.g., hard drive, solid-state drive, etc.). Memory 161 may include random access memory (RAM) 162 and read only memory (ROM) 163. Storage devices 114 can be communicatively coupled with processors 116 via bus 112. Storage devices 114 may include a main memory, which can be used for storing temporary variables or other intermediate information during execution of instructions to be executed by processors 116. Such instructions, after being stored in non-transitory storage media accessible to processors 116, render server 110 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media and/or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Various forms of media can be involved in carrying one or more sequences of one or more instructions to processors 116 for execution. For example, the instructions can initially be carried out on a magnetic disk or solid-state drive of a remote computer. The remote computer can load the instructions into its dynamic memory and send the instructions over a telephone line using a modem. A modem local to server 110 can receive the data on the telephone line and use an infra-red transmitter to convert the data to an infra-red signal. An infra-red detector can receive the data carried in the infra-red signal and appropriate circuitry can place the data on bus 112. Bus 112 carries the data to the main memory within storage devices 114, from which processors 116 retrieves and executes the instructions.

Figure 10:
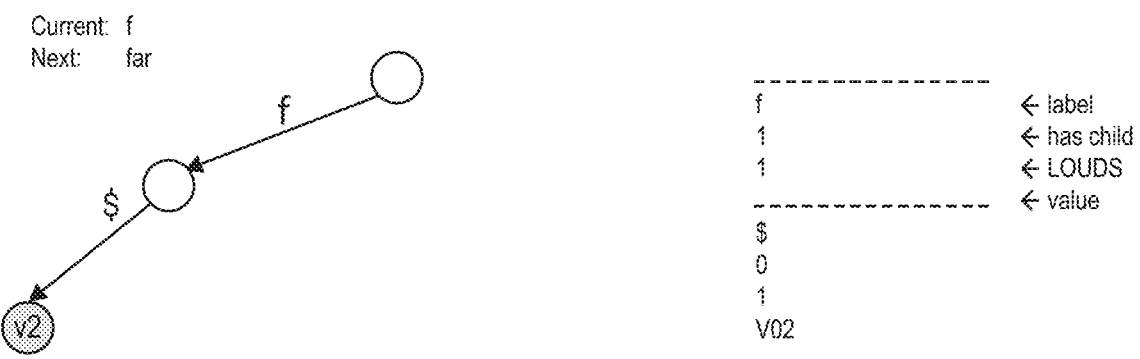
FIG. 10 illustrates an example step in constructing a trie using a key "f," according to some embodiments of the present disclosure.

A trie can be constructed by adding keys in ascending order. FIG. 10 illustrates an example step in constructing a trie using a key "f," according to some embodiments of the present disclosure. As shown in FIG. 10, the trie to be constructed is shown on the right, and a visualization of the trie is shown on the left. Using the succinct trie of FIG. 2 as an example, a first key to be inserted can be key "f." In the top layer, the root node can now comprise one label that is represented by key "f." In some embodiments, by peeking into the next key "far," it can be determined that the current key "f" is a prefix for the next key "far." As a result, a special label "$" can be added to a child node of key "f" to represent a value "v2," which is associated with key "f." In some embodiments, the special label "$" can be the first label in the next level.

Figure 11:
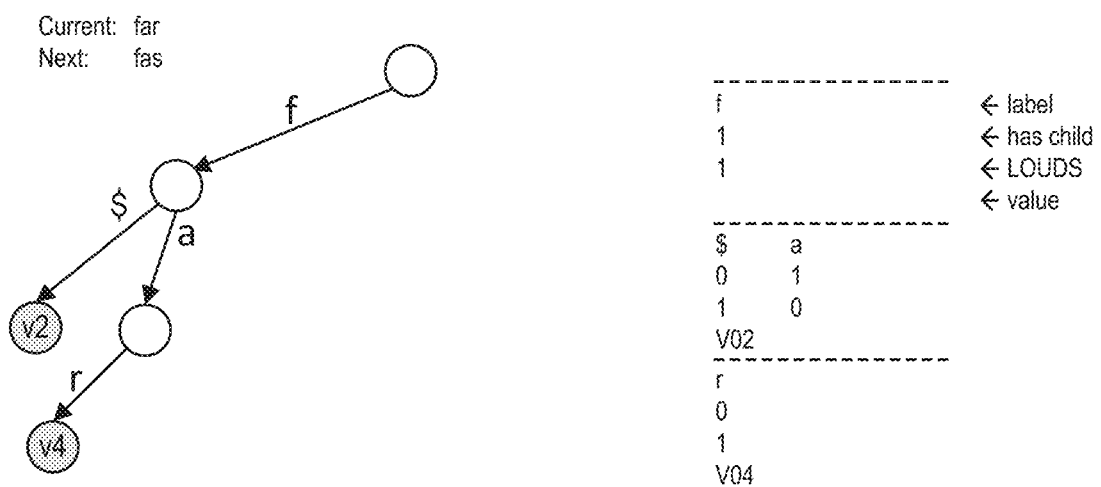
FIG. 11 illustrates an example step in constructing a trie using a key "far," according to some embodiments of the present disclosure.

After the step in FIG. 10, the next key "far" can be inserted. FIG. 11 illustrates an example step in constructing a trie using a key "far," according to some embodiments of the present disclosure. As shown in FIG. 11, the next key "far" can be inserted under the label that is represented by key "f." As a result, the first node in the second level can now comprise two labels, and there can be a node in the third level.

Figure 12:
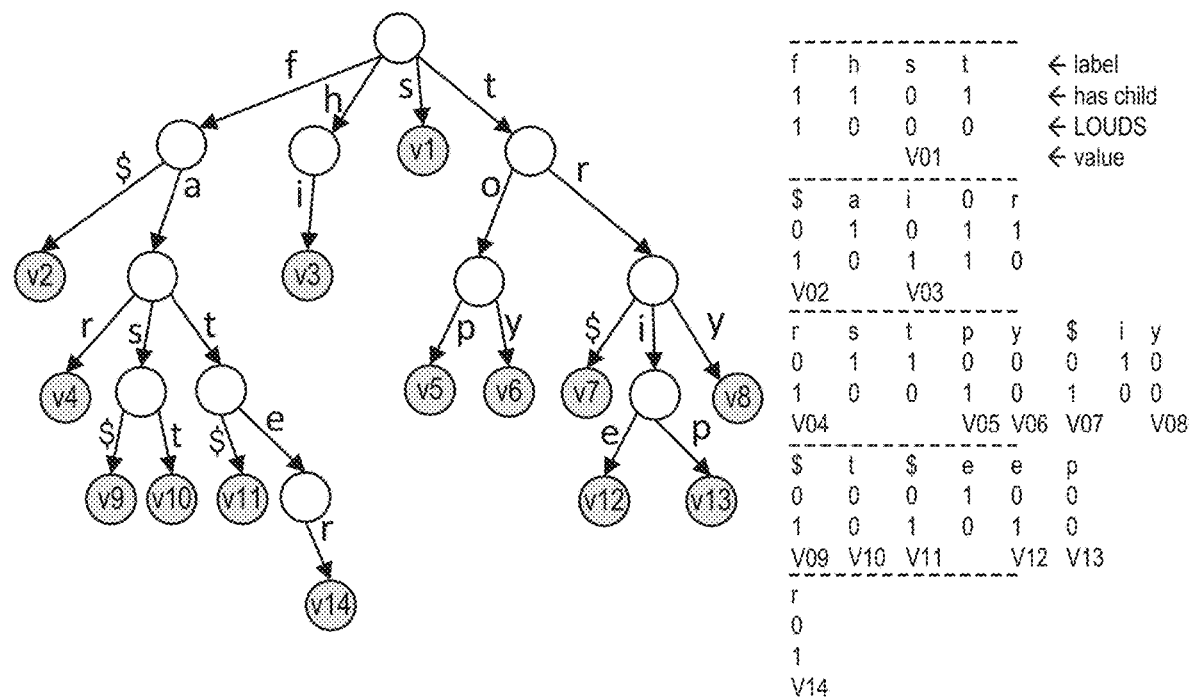
FIG. 12 illustrates an example trie with keys inserted in order, according to some embodiments of the present disclosure.

Other keys can be inserted into the trie similar to the steps shown in FIG. 10 and FIG. 11, until all keys have been inserted into the trie. FIG. 12 illustrates an example trie with keys inserted in order, according to some embodiments of the present disclosure. Starting from the top, the sequences in each level shown in FIG. 12 can be concatenated to get the trie shown in FIG. 2, which can be used for query execution.

The present disclosure provides a method to partition a succinct trie. In some embodiments, the partition can be executed after the construction process (e.g., construction processes shown in FIG. 10, FIG. 11, and FIG. 12). In some embodiments, as a part of the partitioning, a method can be used to separate a sub-trie from the trie. FIG. 13 illustrates an example pseudocode for separating a number of nodes from a set of sequences in a succinct trie, according to some embodiments of the present disclosure. As shown in FIG. 13, a "Sequences" data structure can be created to comprise four variables: "labels," "hasChild," "louds," and "values." Each variable corresponds to a sequence in a succinct trie (e.g., succinct trie of FIG. 2). The pseudocode of FIG. 13 comprises an algorithm that includes two input variables "k" and "input_sequences" and an output variable "output_sequences." The input variable "k" is a number of nodes to be removed. The input variable "input_sequences" comprises sequences from a given level in the succinct trie. The output variable "output_sequences" comprises sequences including the removed k nodes.

Based on the algorithm shown in the pseudocode of FIG. 13, sequences in the output variable "output_sequences" can be determined by removing first n elements from sequences in the input variable "input_sequences." The variable n can be determined as:

$$n = select_1 (input\_sequences.louds, k+1). \quad (6)$$

Based on the equation above, the variable n can be determined by finding the location of the end of the k-th node (represented by "k+1") in the "louds" sequence of the input variable "input_sequences." Then, based on the value of the variable n, one or more sequences in the output variable "output_sequences" can be determined by separating the first n elements from the corresponding sequences in the input variable "input_sequences."

Figure 14:
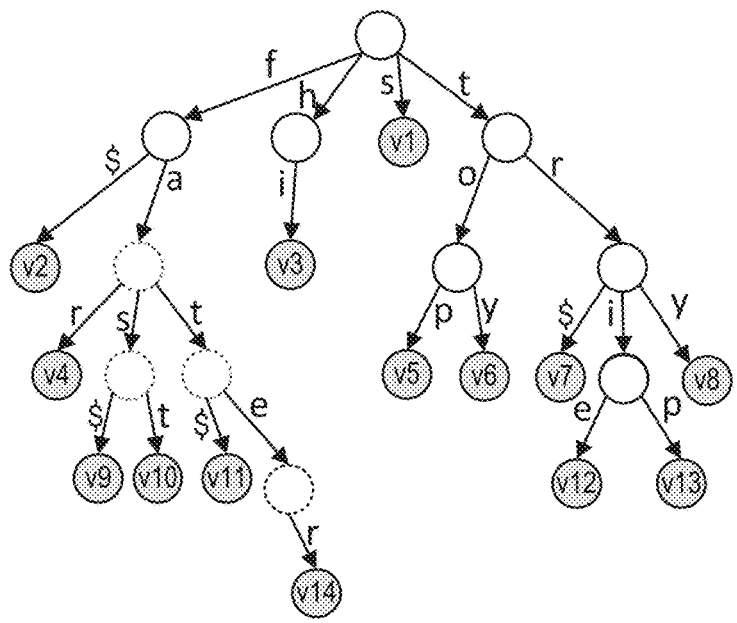
FIG. 14 illustrates an example step for separating a sub-trie from a succinct trie, according to some embodiments of the present disclosure.

FIG. 14 illustrates an example step for separating a sub-trie from a succinct trie, according to some embodiments of the present disclosure. Using the algorithm shown in FIG. 13, FIG. 14 is an example of how the left most sub-trie in a third level (e.g., with prefix "fa") can be separated from the succinct trie (e.g., succinct trie of FIG. 2). As shown in FIG. 14, nodes about to be separated are shown in bold font on the right and depicted using dotted lines in the visualization on the left. In some embodiments, a node is a collection of edges. For example, the node represented by the prefix "fa" can comprise edges represented by labels "f," "s," and In some embodiments, nodes can be separated by executing the algorithm in FIG. 13 repeatedly. For example, as shown in FIG. 14, the node represented by prefix "fa" can be separated first. By counting the number of value 1 in the "hasChild" sequence, the number of nodes to be separated in the next level can be determined. For example, as shown in FIG. 14, the node represented by prefix "fa" has three child nodes, which are represented by prefixes "far," "fas," and "fat." Two of the three child nodes have "hasChild" bits set to 1 (e.g., nodes represented by prefixes "fas" and "fat"). As a result, the two child nodes can be further separated. As shown in FIG. 14, there are two nodes to be separated from a fourth level and one node to be separated from a fifth level. In the end, there can be three sets of sequences that are separated, which are shown in bold font in FIG. 14. In some embodiments, these three sets of sequences can be concatenated to form a valid succinct trie.

Figure 15:
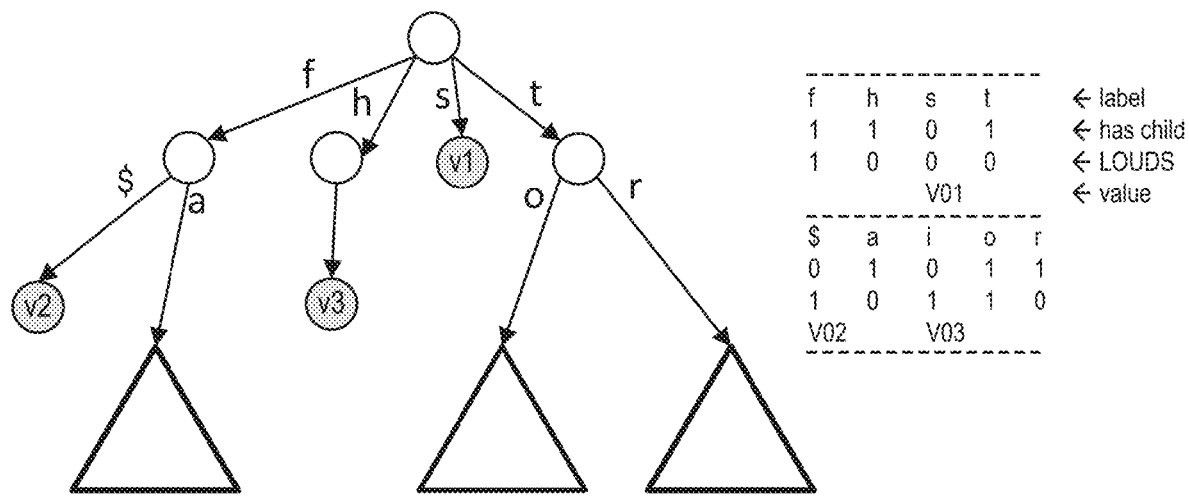
FIG. 15 illustrates an example step for separating multiple sub-tries from a succinct trie, according to some embodiments of the present disclosure.

Using the step shown in FIG. 14, multiple sub-tries can be separated from the succinct trie. FIG. 15 illustrates an example step for separating multiple sub-tries from a succinct trie, according to some embodiments of the present disclosure. By executing repeatedly the algorithm of FIG. 13 or the step of FIG. 14, all sub-tries beyond a certain level can be separated (e.g., third level shown in FIG. 15). As shown in FIG. 15, sub-tries that are separated are depicted as bolded triangles. Similar to the sub-trie that is separated in FIG. 14, each of the sub-tries can be a valid succinct trie by itself. After the sub-tries are separated, the sequences that are left are shown on the right of FIG. 15.

Figure 16:
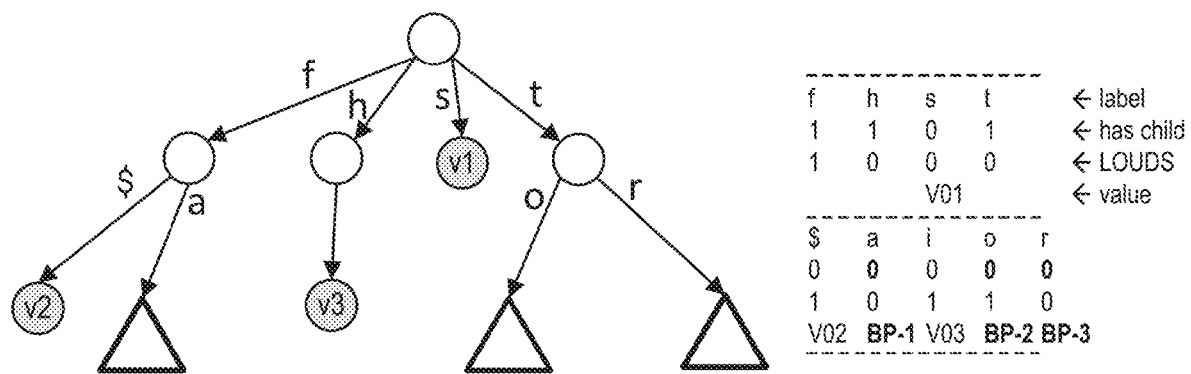
FIG. 16 illustrates an example step of reaching sub-tries from a main succinct trie, according to some embodiments of the present disclosure.

In some embodiments, after the sub-tries are separated, the sub-tries can be reached using sub-tries's memory addresses (e.g., block addresses). For example, the block addresses of the sub-tries can be added as pointers to the original succinct trie. FIG. 16 illustrates an example step of reaching sub-tries from a main succinct trie, according to some embodiments of the present disclosure. In some embodiments, the step of FIG. 16 can be executed after sub-tries have been separated (e.g., step shown in FIG. 15). As shown in FIG. 16, the original succinct trie has two levels left after the sub-tries beyond level three have been separated. Since the second level is now the bottom level, every "hasChild" bit may indicate that there is no child node (e.g., a value of 0). For example, the "hasChild" sequence can be scanned. If the original value in the "hasChild" bit indicates that there is a child node (e.g., a value of 1), the "hasChild" bit can be flipped (e.g., a value of 0).

In some embodiments, a block pointer for the newly separated sub-trie can be added into the corresponding entry in the "values" sequence. For example, as shown in FIG. 16, the node that is represented by prefix "fa" can point to a sub-trie. As a result, the "hasChild" bit for the node can be flipped (e.g., a value of 0), and the corresponding entry in the "values" sequence can be edited to comprise the block pointer of the sub-trie (e.g., "BP-1"). As a result, when the node is reached, the block pointer stored in the "values" sequence (e.g., "BP-1") can be accessed to locate the corresponding sub-trie.

FIG. 17 illustrates an example pseudocode for reaching sub-tries from a main succinct trie, according to some embodiments of the present disclosure. As shown in FIG. 17, the "hasChild" sequence for the bottom level can be scanned (e.g., the "for" loop shown on FIG. 17). If a "hasChild" bit indicates that the node has a child (e.g., a value of 1), the "hasChild" bit is flipped, and the corresponding entry in the "values" sequence can be edited to comprise the block pointer of the sub-trie.

Figure 18:
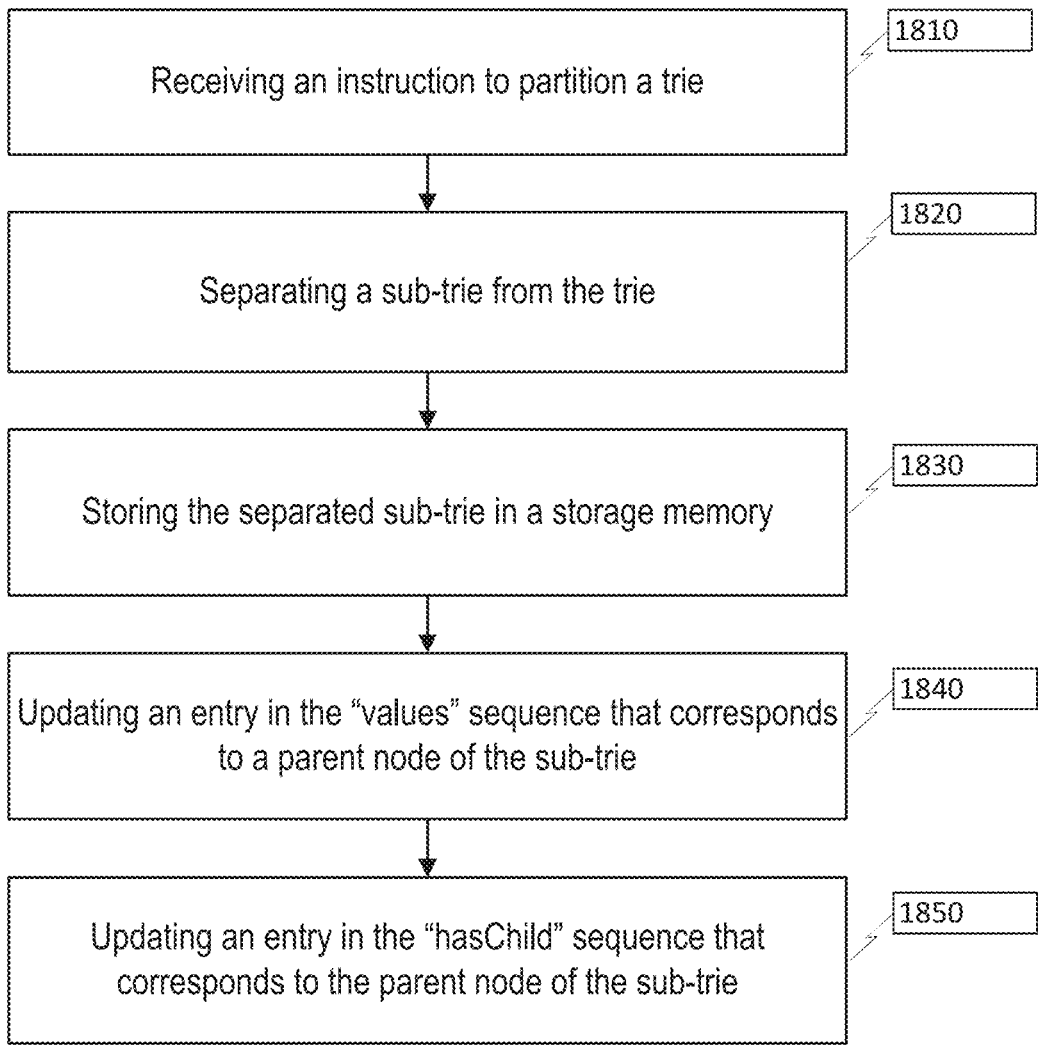
FIG. 18 illustrates a flow diagram of an example method for partitioning a trie in a database, according to some embodiments of the present disclosure.

Embodiments of the present disclosure further provide a method for partitioning a trie in the database. FIG. 18 illustrates a flow diagram of an example method for partitioning a trie in a database, according to some embodiments of the present disclosure. It is appreciated that method 1800 in FIG. 18 can be performed on a succinct trie structure similar to the one shown in FIG. 12. It is also appreciated that method 1100 can be performed by a data storage system (e.g., data storage system 100 of FIG. 9) or by one or more servers (e.g., example server 110 of FIG. 9).

In step 1810, an instruction is received to partition a trie. In some embodiments, the instruction can be received from a user of the database, or the database itself. For example, the database can have a background process that partitions the trie based on the performance of the trie in the database. In some embodiments, the background process can decide to partition the trie when the size of the trie reaches a threshold. In some embodiments, the instruction can comprise one or more identifications of sub-tries to be separated. For example, the instruction can comprise a prefix "fa," indicating that the sub-trie corresponding to the prefix "fa" can be separated.

In step 1820, a sub-trie is separated from the trie. In some embodiments, the sub-trie can be separated by removing entries corresponding to the sub-trie, similar to the algorithm of FIG. 13 or the step shown in FIG. 14.

In some embodiments, step 1820 can be repeated to separate all sub-tries beyond a level of the trie. For example, as shown in FIG. 16, each sub-trie beyond the third level of the succinct trie can be separated using the steps shown in FIG. 14 and FIG. 15.

Referring back to FIG. 18, in step 1830, each separated sub-trie can be stored in a storage memory. In some embodiments, the storage memory is similar to storage devices 114, memory 161, or physical storage 164 of FIG. 9. In some embodiments, a memory address can be obtained for the sub-trie when the sub-trie is stored in the storage memory.

In step 1840, an entry in the "values" sequence that corresponds to a parent node of the sub-trie is updated using a memory address of the sub-trie. In some embodiments, the entry is updated according to the step shown in FIG. 16.

In step 1850, an entry in the "hasChild" sequence that corresponds to the parent node of the sub-trie is updated. In some embodiments, the entry is updated according to the step shown in FIG. 16. For example, if the entry in the "hasChild" sequence corresponding to the parent node comprises a value indicating that the parent node has one or more child nodes (e.g., a value of 1), the bit in the entry can be flipped, indicating that the parent node no longer has the child nodes.

Methods, steps and algorithms described in FIGS. 13-18 provide innovative solutions to partition a succinct trie into multiple pieces. Compared with existing solutions, solutions in the present disclosure can take advantages of the tree structure of a succinct trie and perform partitioning on the succinct trie directly according to the succinct trie's tree structure. In addition, solutions in the present disclosure can cut down the depth of the succinct trie by separating all sub-tries beyond a certain level of the succinct trie. As a result, each resulting sub-trie, including the original succinct trie with the sub-tries removed, can have a reduced number of levels, further improving query performance.

The various example embodiments described herein are described in the general context of method steps or processes, which may be implemented in one aspect by a computer program product, embodied in a computer-readable medium, including computer-executable instructions, such as program code, executed by computers in networked environments. In some embodiments, a data storage system (e.g., data storage system 100 of FIG. 9) may instruct components (e.g., physical storage 164 of FIG. 9) of computer system (e.g., server 110 of FIG. 9) to perform various functions described above. A computer-readable medium may include removeable and nonremovable storage devices including, but is not limited to, Read Only Memory (e.g., ROM 163 of FIG. 9), Random Access Memory (e.g., RAM 162 of FIG. 9), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The embodiments may further be described using the following clauses:

1. A method comprising:
receiving an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence;

separating a sub-trie from the trie by removing entries corresponding to the sub-trie from the first, the second, the third, and the fourth sequences; and updating an entry in the fourth sequence corresponding to a parent node of the sub-trie using a memory address of the sub-trie.

2. The method according to clause 1, further comprising:
storing the sub-trie into a storage memory; and
obtaining the memory address of the sub-trie according to the storing of the sub-trie.

3. The method according to clause 1 or 2, further comprising:
updating an entry in the second sequence that corresponds to the parent node of the sub-trie.

4. The method according to any one of clauses 1-3, wherein separating the sub-trie from the trie by removing entries corresponding to the sub-trie from the first, second, third, and fourth sequences further comprises:
locating entries in the trie that correspond to the parent node of the sub-trie;
locating entries that correspond to the sub-trie according to the entries that correspond to the parent node; and
removing the entries corresponding to the sub-trie.

5. The method according to clause 4, wherein locating entries that correspond to the sub-trie according to the entries corresponding to the parent node further comprises:
determining entries corresponding to one or more child nodes of the parent node according to the parent node's entry in the second sequence and the parent node's entry in the third sequence.

6. The method according to any one of clauses 1-5, wherein:
each entry in the second sequence comprises a bit value.

7. The method according to any one of clauses 1-6, wherein:
each entry in the third sequence comprises a bit value.

8. The method according to any one of clauses 1-7, wherein:
the trie is a part of a filter or an index for the database.

9. A data storage system, comprising:
a memory storing a set of instructions; and
a processor configured to execute the set of instructions to cause the data storage system to:
receive an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence,
separate a sub-trie from the trie by removing entries corresponding to the sub-trie from the first, the second, the third, and the fourth sequences, and
update an entry in the fourth sequence corresponding to a parent node of the sub-trie using a memory address of the sub-trie.

10. The data storage system according to clause 9, wherein the processor is further configured to execute the set of instructions to cause the data storage system to:
store the sub-trie into a storage memory; and
obtain the memory address of the sub-trie according to the storing of the sub-trie.

11. The data storage system according to clause 9 or 10, wherein the processor is further configured to execute the set of instructions to cause the data storage system to:
update an entry in the second sequence that corresponds to the parent node of the sub-trie.

12. The data storage system according to any one of clauses 9-11, wherein the processor is further configured to execute the set of instructions to cause the data storage system to:
locate entries in the trie that correspond to the parent node of the sub-trie;
locate entries that correspond to the sub-trie according to the entries that correspond to the parent node; and
remove the entries corresponding to the sub-trie.

13. The data storage system according to clause 12, wherein the processor is further configured to execute the set of instructions to cause the data storage system to:
determine entries corresponding to one or more child nodes of the parent node according to the parent node's entry in the second sequence and the parent node's entry in the third sequence.

14. The data storage system according to any one of clauses 9-13, wherein:
each entry in the second sequence comprises a bit value.

15. The data storage system according to any one of clauses 9-14, wherein:
each entry in the third sequence comprises a bit value.

16. The data storage system according to any one of clauses 9-15, wherein:
the trie is a part of a filter or an index for the database.

17. A non-transitory computer readable medium that stores a set of instructions that is executable by one or more processors of an apparatus to cause the apparatus to initiate a method for executing a query in a database, the method comprising:
receiving an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence;
separating a sub-trie from the trie by removing entries corresponding to the sub-trie from the first, the second, the third, and the fourth sequences; and
updating an entry in the fourth sequence corresponding to a parent node of the sub-trie using a memory address of the sub-trie.

18. The non-transitory computer readable medium according to clause 17, wherein the method further comprises:
storing the sub-trie into a storage memory; and
obtaining the memory address of the sub-trie according to the storing of the sub-trie.

19. The non-transitory computer readable medium according to clause 17 or 18, wherein the method further comprises:
updating an entry in the second sequence that corresponds to the parent node of the sub-trie.

20. The non-transitory computer readable medium according to any one of clauses 17-19, wherein the method further comprises:
locating entries in the trie that correspond to the parent node of the sub-trie;
locating entries that correspond to the sub-trie according to the entries that correspond to the parent node; and
removing the entries corresponding to the sub-trie.

21. The non-transitory computer readable medium according to clause 20, wherein the method further comprises:
determining entries corresponding to one or more child nodes of the parent node according to the parent node's entry in the second sequence and the parent node's entry in the third sequence.

22. The non-transitory computer readable medium according to any one of clauses 17-21, wherein:
each entry in the second sequence comprises a bit value.

23. The non-transitory computer readable medium according to any one of clauses 17-22, wherein:
each entry in the third sequence comprises a bit value.

24. The non-transitory computer readable medium according to any one of clauses 17-23, wherein:
the trie is a part of a filter or an index for the database.

In the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. A method comprising:
receiving an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence;
separating a sub-trie from the trie by removing entries corresponding to the sub-trie from the first, the second, the third, and the fourth sequences; and
updating an empty entry in the fourth sequence corresponding to a parent node of the sub-trie using a memory address of the sub-trie.

2. The method according to claim 1, further comprising:
storing the sub-trie into a storage memory; and
obtaining the memory address of the sub-trie according to the storing of the sub-trie.

3. The method according to claim 1, further comprising:
updating an entry in the second sequence that corresponds to the parent node of the sub-trie.

4. The method according to claim 1, wherein separating the sub-trie from the trie by removing entries corresponding to the sub-trie from the first, second, third, and fourth sequences further comprises:
locating entries in the trie that correspond to the parent node of the sub-trie;
locating entries that correspond to the sub-trie according to the entries that correspond to the parent node; and
removing the entries corresponding to the sub-trie.

5. The method according to claim 4, wherein locating entries that correspond to the sub-trie according to the entries corresponding to the parent node further comprises:
determining entries corresponding to one or more child nodes of the parent node according to the parent node's entry in the second sequence and the parent node's entry in the third sequence.

6. The method according to claim 1, wherein:
each entry in the second sequence comprises a bit value; and
each entry in the third sequence comprises a bit value.

7. The method according to claim 1, wherein:
the trie is a part of a filter or an index for the database.

8. A data storage system, comprising:
a memory storing a set of instructions; and
a processor configured to execute the set of instructions to cause the data storage system to:
receive an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence,
separate a sub-trie from the trie by removing entries corresponding to the sub-trie from the first, the second, the third, and the fourth sequences, and
update an empty entry in the fourth sequence corresponding to a parent node of the sub-trie using a memory address of the sub-trie.

9. The data storage system according to claim 8, wherein the processor is further configured to execute the set of instructions to cause the data storage system to:
store the sub-trie into a storage memory; and
obtain the memory address of the sub-trie according to the storing of the sub-trie.

10. The data storage system according to claim 8, wherein the processor is further configured to execute the set of instructions to cause the data storage system to:
update an entry in the second sequence that corresponds to the parent node of the sub-trie.

11. The data storage system according to claim 8, wherein the processor is further configured to execute the set of instructions to cause the data storage system to:
locate entries in the trie that correspond to the parent node of the sub-trie;
locate entries that correspond to the sub-trie according to the entries that correspond to the parent node; and
remove the entries corresponding to the sub-trie.

12. The data storage system according to claim 11, wherein the processor is further configured to execute the set of instructions to cause the data storage system to:
determine entries corresponding to one or more child nodes of the parent node according to the parent node's entry in the second sequence and the parent node's entry in the third sequence.

13. The data storage system according to claim 8, wherein:
each entry in the second sequence comprises a bit value; and
each entry in the third sequence comprises a bit value.

14. The data storage system according to claim 8, wherein:
the trie is a part of a filter or an index for the database.

15. A non-transitory computer readable medium that stores a set of instructions that is executable by one or more processors of an apparatus to cause the apparatus to initiate a method for executing a query in a database, the method comprising:

receiving an instruction to partition a trie in a database, wherein the trie comprises a first sequence of values comprising information that indicates labels of keys in the trie, a second sequence of values comprising information that indicates whether the labels in the first sequence have one or more child nodes, a third sequence of values comprising information that indicates whether the labels in the first sequence are first child nodes under a parent node, and a fourth sequence of values comprising information that indicates values that corresponds to the labels in the first sequence;

separating a sub-trie from the trie by removing entries corresponding to the sub-trie from the first, the second, the third, and the fourth sequences; and updating an empty entry in the fourth sequence corresponding to a parent node of the sub-trie using a memory address of the sub-trie.

16. The non-transitory computer readable medium according to claim 15, wherein the method further comprises:

storing the sub-trie into a storage memory; and obtaining the memory address of the sub-trie according to the storing of the sub-trie.

17. The non-transitory computer readable medium according to claim 15, wherein the method further comprises:

updating an entry in the second sequence that corresponds to the parent node of the sub-trie.

18. The non-transitory computer readable medium according to claim 15, wherein the method further comprises:

locating entries in the trie that correspond to the parent node of the sub-trie;

locating entries that correspond to the sub-trie according to the entries that correspond to the parent node; and removing the entries corresponding to the sub-trie.

19. The non-transitory computer readable medium according to claim 18, wherein the method further comprises:

determining entries corresponding to one or more child nodes of the parent node according to the parent node's entry in the second sequence and the parent node's entry in the third sequence.

20. The non-transitory computer readable medium according to claim 15, wherein:

each entry in the second sequence comprises a bit value;

each entry in the third sequence comprises a bit value; and the trie is a part of a filter or an index for the database.

* * * * *